United States Patent [19]

Hirata et al.

[11] Patent Number: 4,470,078
[45] Date of Patent: Sep. 4, 1984

[54] PULSE DRIVEN CONTROL CIRCUIT FOR MOVING A TRANSDUCER ACROSS A ROTARY RECORDING MEDIUM OF PULSES APPLIED THERETO

[75] Inventors: Atsumi Hirata, Fujisawa; Katsuyuki Mitsui, Sagamihara; Yasutaka Koumatsu, Fujisawa, all of Japan

[73] Assignee: Victor Company of Japan, Ltd., Yokohama, Japan

[21] Appl. No.: 246,721

[22] Filed: Mar. 23, 1981

[30] Foreign Application Priority Data

Mar. 22, 1980 [JP] Japan .................................. 55-36558

[51] Int. Cl.³ ........................ H04N 5/76; G11B 21/12
[52] U.S. Cl. .................................. 358/342; 360/10.1; 360/10.2; 369/43
[58] Field of Search ................... 358/128.5, 128.6, 127, 358/129–132, 342; 369/43, 32–33, 41, 47; 360/10, 77, DIG. 1, 10.1, 10.2

[56] References Cited

U.S. PATENT DOCUMENTS

| | | | |
|---|---|---|---|
| 4,190,859 | 2/1980 | Kinso | 358/128.5 |
| 4,247,741 | 1/1981 | Tatsuguchi et al. | 369/43 |
| 4,322,748 | 3/1982 | Tatsuguchi | 358/128.5 |
| 4,330,879 | 3/1982 | Wine | 369/32 |
| 4,331,976 | 5/1982 | Kinjo et al. | 358/128.6 |
| 4,340,907 | 7/1982 | Hirata et al. | 358/128.6 |

Primary Examiner—Raymond F. Cardillo, Jr.
Attorney, Agent, or Firm—Louis Bernat

[57] ABSTRACT

A control circuit causes a reproducing transducer feeding motor to move the transducer radially across a disc having a video signal recorded thereon. The video signal is recorded along a spiral track, together with first, second, and third reference signals which control the transducer tracking. A feed pulse forming circuit forms a number of feed pulses according to the number of switching pulses which are generated due to the reproduction of the third reference signal. A number of kick pulses are required for shifting the reproducing transducer element from one track turn to another track turn as it moves toward a center of the rotary recording medium, with the movement occurring at a position where the third reference signal is recorded. The control circuit causes a rotation of the motor for moving the reproducing transducer along the radial direction of the disc, according to the number of feed pulses that are obtained from the feed pulse forming circuit.

5 Claims, 6 Drawing Figures

PULSE DRIVEN CONTROL CIRCUIT FOR MOVING A TRANSDUCER ACROSS A ROTARY RECORDING MEDIUM OF PULSES APPLIED THERETO

BACKGROUND OF THE INVENTION

The present invention generally relates to control circuits for reproducing transducer feeding motor in rotary recording medium reproducing apparatuses, and more particularly to a motor control circuit which controls the rotational drive of a motor for feeding a reproducing transducer of a reproducing apparatus along the radial direction of a rotary recording medium, according to the number of pulses applied to the above control circuit.

A new information signal recording system has been proposed in a U.S. Pat. No. 4,331,976 entitled "High Density Recording System Using Side-By-Side Information and Servo Tracks" issued May 25, 1982 of which the assignee is the same as that of the present application. According to this proposed system, the recording system forms pits in accordance with the information signal being recorded along a spiral track on a flat disc-shaped recording medium (hereinafter referred to as a disc), without forming a groove therein. In a reproducing system for reproducing the disc recorded by this proposed system, a reproducing stylus traces over along this track thereby to reproduce the recorded information signal in response to variations in electrostatic capacitance.

In this proposed recording system, since a groove for guiding the reproducing stylus is not provided on the disc, pilot or reference signals should be recorded on or in the vicinity of a track of the information signal, such as a video signal, on the disc. Upon reproduction, the reference signals are reproduced together with the video signal. Tracking servo control is carried out so that the reproducing stylus accurately traces along the track in response to the reproduced reference signals.

By use of this previously proposed system, there is no possibility whatsoever of the reproducing stylus or the disc being damaged since the recording track has no groove. The stylus can trace the same portion of the track repeatedly many times, whereby a special reproduction such as still, slow-motion, or quick-motion reproduction becomes possible.

Thus, in a U.S. Pat. No. 4,340,907 entitled "Special Reproducing System in an Apparatus for Reproducing Video Signals from a Rotary Recording Medium" issued July 20, 1982, of which the assignee is the same as that of the present application, a special reproducing system in a disc reproducing apparatus was proposed which is capable of performing a special reproduction in which a picture having a motion different from that upon normal reproduction is obtained in an excellent manner.

The special reproducing system comprises a reproducing element for tracing the track of the disc and picking up the recorded signal, a tracking control mechanism for operating in response to skip pulses applied thereto to cause the reproducing element to shift to an adjacent track turn of the spiral track thereby to undergo skipping, and a skip pulse generating circuit for generating skip pulses with timings corresponding to the vertical blanking period positions of the recorded video signal, where the skip pulses are of a number corresponding to an operational mode for carrying out a special reproduction differing from normal reproduction at every rotational period of the rotary recording medium, and supplying the skip pulses to the tracking control mechanism. The reproducing element is skipped to an adjacent track turn within the vertical blanking period of the recorded video signal, by the tracking control mechanism responsive to the skip pulses.

Accordingly, the noise introduced when the reproducing element moves to an adjacent track does not appear in the picture, and a special reproduction such as still reproduction, slow-motion and quick-motion reproduction in the forward direction, and normal-speed, slow-motion, and quick-motion reproduction in the backward direction can be performed in which a fine picture is obtained. Furthermore, the reproducing element can be moved or transferred at a high speed to enable a high-speed reproduction, by reproducing while performing tracking control with respect to a random access where the reproducing element is rapidly moved to a predetermined position, or with respect to the scanning of the tracks performed by the reproducing element.

Hence, it is necessary to move the reproducing transducer including the reproducing element at different speeds, according to each of the reproduction modes. Moreover, upon starting of the reproduction, it is necessary to mode the reproducing transducer from a waiting position to the starting position on the disc at a high speed, within a short period of time. Thus, it becomes necessary to variably control the moving speed of the reproducing transducer, according to the operational state of the above reproducing apparatus.

In the above proposed reproducing apparatus, the speed control with respect to the feeding (moving) of the above reproducing transducer including the reproducing element, in the radial direction of the disc, upon the above described special reproduction modes, is performed by controlling the voltage applied to a D.C. motor used for driving and feeding the reproducing transducer as described above. However, this method is disadvantageous in that the speed varying range for performing reproduction at various speeds, cannot be set to a wide range. Furthermore, another method can be considered in which the meshing of gears are changed over to change over the transmitting speed to the reproducing transducer from the motor, according to the above operational modes. However, this method is disadvantageous in that the size of the whole apparatus becomes large, and the cost of the apparatus becomes high.

SUMMARY OF THE INVENTION

Accordingly, a general object of the present invention is to provide a novel and useful control circuit for reproducing transducer feeding motor in a rotary recording medium reproducing apparatus, in which the above described problems have been eliminated.

Another and more specific object of the present invention is to provide a control circuit for reproducing transducer feeding motor in a rotary recording medium reproducing apparatus, which applies a number of driving pulses respective of the operational mode of the reproducing apparatus to a reproducing transducer feeding motor, to control the feeding speed of the reproducing transducer according to the operational mode of the reproducing apparatus. According to the control circuit of the present invention, the rotational control range of the motor can be set to a wide range, and the reproducing apparatus can be manufactured at low cost.

Still another object of the present invention is to provide a motor control circuit which controls the rotation of a reproducing transducer feeding motor, by a driving pulse having a pulse width which is modulated according to the D.C. component of the tracking error signal. According to the control circuit of the present invention, the rotational control of the above motor can be performed within a large range, and the feeding error of the reproducing transducer can be corrected.

Other objects and further features of the present invention will be apparent from the following detailed description when read in conjunction with the accompanying drawings.

DETAILED DESCRIPTION

Figure 1:
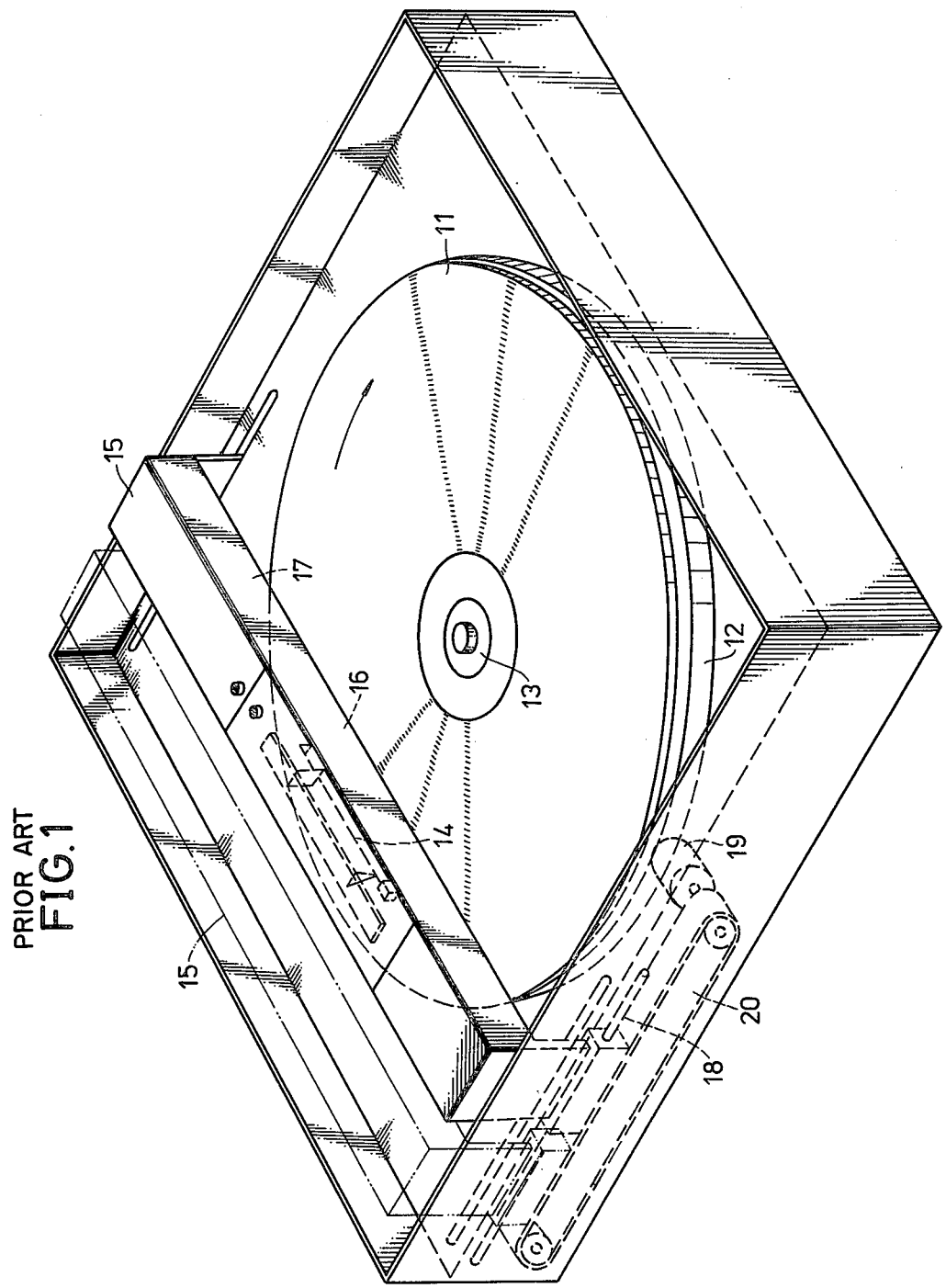
FIG. 1 is a perspective view showing an example of a rotary recording medium reproducing apparatus to which a motor control circuit according to the present invention can be applied.

The general features of the exterior of a reproducing apparatus for reproducing a rotary recording medium, in which a motor control circuit according to the invention can be applied, is illustrated in FIG. 1. In this apparatus, a disc 11 is a rotary recording medium having a video signal recorded thereon. The disc 11 is set on and clamped onto a turntable 12 by a clamper 13. The disc 11 is thus rotated unitarily with the turntable 12 at a rotational speed of 900 rpm, for example.

A signal pickup device 14, used as a reproducing transducer, is mounted at a re-entrant cylindrical cavity resonator 16 within a carriage 15. The pickup is connected to a central conductor (not shown) of the resonator. The central conductor is electro-magnetically connected to a high frequency oscillator 17 for producing a frequency of 1 GHz, for example. This organization is well known. The cartridge 15 is disposed horizontally above the turntable 12, and is guided at its ends by a pair of parallel horizontal guide bars 18 (only one shown). This carriage 15, driven by an endless belt 20 which is driven by a D.C. motor 19, moves continuously and linearly in a direction from the outer peripheral part to the inner peripheral part at a speed equal to the distance of one track pitch per revolution of the turntable 12, during a forward normal reproducing mode. The carriage movement is in synchronism with the rotation of the turntable. As a result of this movement of the carrier 15, a stylus of the signal pickup device 14 travels radially across the rotating disc 11 and relatively traces the spiral track of the disc 11.

Figure 2:
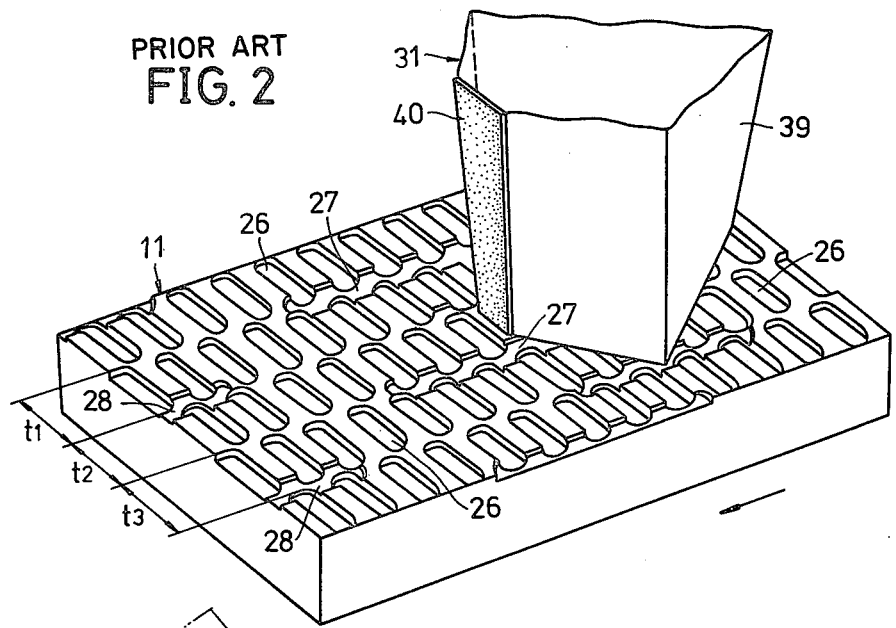
FIG. 2 is a perspective view, on a large scale, showing a part of a rotary recording medium together with a tip part of a reproducing stylus.

A video signal is recorded on a spiral track with pits formed on the disc 11 responsive to the information contents of the signal. One part of this track is shown in an enlarged scale in FIG. 2. In FIG. 2, track turns of a single continuous spiral track, corresponding to each revolution of the disc 11, are designated by $t_1$, $t_2$, $t_3$, . . . . Each track turn is constituted by the formation of pits 26 of the main information signal along the plane track path and has no stylus guide groove formed therein. With respect to one track turn $t_1$, in every horizontal scanning period ($\underline{H}$) at a position corresponding to the horizontal blanking period, pits 27 of a first reference signal fp1 are formed on one lateral side of the track as viewed in the track path direction. Pits 28 of a second reference signal fp2 are formed on the other side of the track.

In an intermediate position between centerlines of adjacent track turns, only pits of either one kind of the pits 27 and 28 of the above reference signals fp1 and fp2 are formed, and with respect to one track, moreover, the sides on which the pits 27 and 28 are formed are alternated for every track turn. That is, if the pits 27 and 28 are respectively formed on the right and left sides of one track turn, for example, the pits 28 and 27 will respectively be formed on the right and left sides of each of the adjacent track turns.

Figure 4:
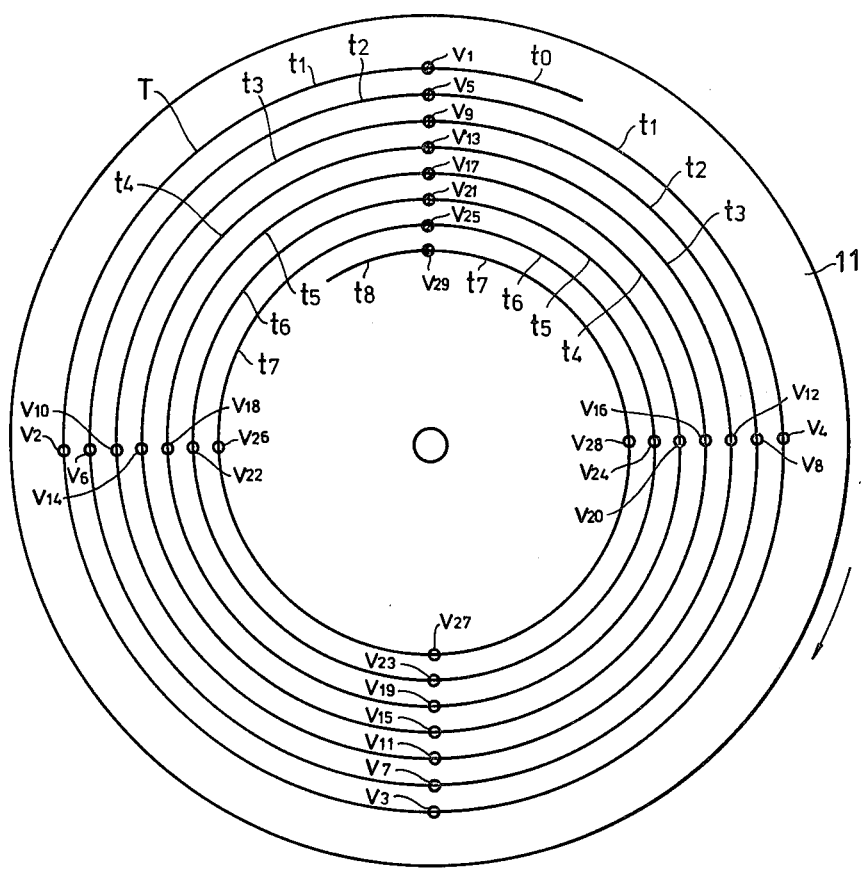
FIG. 4 is a diagrammatic plan view indicating vertical synchronizing signal positions on a track pattern of a rotary recording medium.

On the disc 11, as indicated in FIG. 4, a video signal is recorded along a spiral track T for two frames, that is, four fields, per one revolution of the disc. In FIG. 4, the tracks of the reference signals fp1 and fp2 are omitted. The positions of the vertical synchronizing signals of respective fields are designated by reference characters V1, V2, V3, . . . , and the successive track parts corresponding to one revolution of the disc of a single spiral track will respectively be designated by track turns $t_1$, $t_2$, $t_3$, . . . . Furthermore, a third reference signal fp3 is recorded at the starting end positions V1, V5, V9, . . . of each of the track turns $t_1$, $t_2$, $t_3$, . . . .

Figure 3:
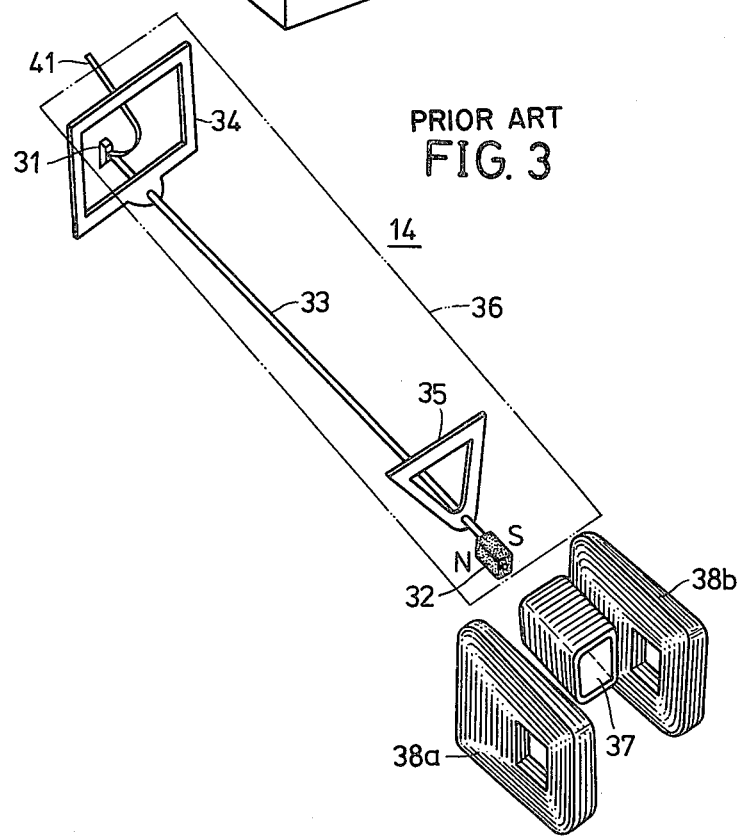
FIG. 3 is an exploded perspective view showing an example of a reproducing transducer in the reproducing apparatus shown in FIG. 1.

One example of the signal pickup device 14 indicated in FIG. 1 will now be described with reference to FIG. 3. This pickup device 14 has a relatively long cantilever arm 33 provided with a reproducing stylus 31 at its distal free end and a permanent magnet member 32 at its proximal root end. This cantilever arm 33 is supported by dampers 34 and 35 which are fixed to the lower surface of a support plate 36.

The support plate 36 is fitted into and held by a holding structure. A coil 37 used for tracking, and pair of coils 38a and 38b used for jitter compensation disposed on both sides of the coil 37, are fixed to the lower surface of the support plate 36. The above permanent magnet member 32 is fitted into the coil 37 with gaps formed therebetween.

The tip end of the reproducing stylus 31 has a shape shown in FIG. 2. The reproducing stylus 31 is constituted by a stylus structure 39 having a disc tracing surface which has a width greater than a track width, and an electrode 40 fixed to the rear face of the stylus structure 39. The electrode 40 is connected with a metal ribbon 40, as shown in FIG. 3. As the reproducing stylus 31 traces along a track on the disc 11 rotating in a direction indicated by an arrow, the video signal recorded thereon by the formation of pits is reproduced as variations in the electrostatic capacitance between the surface of the disc 11 and the electrode 40 of the reproducing stylus 31.

Figure 5:
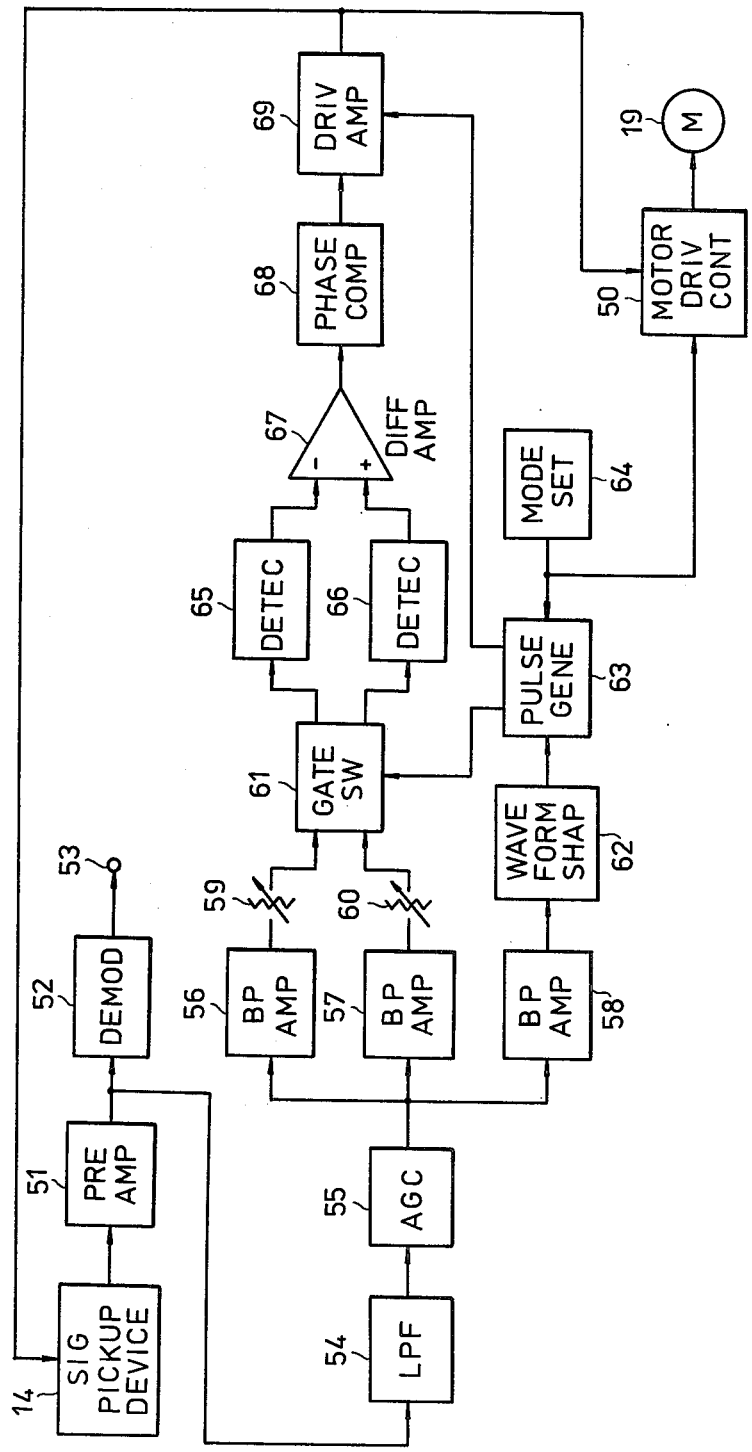
FIG. 5 is a systematic block diagram showing a circuit system of a rotary recording medium reproducing apparatus to which a motor control circuit according to the present invention can be applied.

In the system shown in FIG. 5, a reproduced signal picked up from the disc 11 as minute variations in the electrostatic capacitance by the reproducing stylus 31 of the signal pickup device 14, is supplied to a preamplifier 51 having a resonant circuit. The resonance frequency of the resonant circuit varies in response to this variation in the electrostatic capacitance, and is formed into a signal of a desired level. The resulting output of the preamplifier 51, is demodulated into the original video signal by a demodulator 52 and is obtained as an output through an output terminal 53.

The output signal of the preamplifier 51 is supplied to a lowpass filter 54 wherein the reference signals fp1, fp2, and fp3 are separated. The output reference signals pass through an automatic gain control circuit 55 and are respectively supplied to amplifiers 56, 57, and 58. Here, each of the amplifiers 56, 57, and 58 is a kind of a bandpass amplifier respectively designed to have steep passing frequency characteristics at only the respective frequencies fp1, fp2, and fp3. As a result, the signals having frequencies fp1 and fp2 are respectively separated and obtained from the amplifiers 56 and 57. These signals respectively pass through level adjustors 59 and 60, wherein the levels of the signals are adjusted. The resulting signals are then supplied to a gate switching circuit 61.

The signal fp3 separated and amplified at this bandpass amplifier 58, is supplied to a waveform shaping circuit 62 comprising a Schmitt trigger circuit. The signal thus applied to the waveform shaping circuit 62 undergoes waveform-shaping so that the signal is not affected by noise and other influences. The signal thus subjected to the above waveform-shaping is then supplied to a pulse generating circuit 63. The resulting output switching pulses obtained from this pulse generating circuit 63, are supplied to the gate switching circuit 61.

The gate switching circuit 61 performs switching of the signals fp1 and fp2 every one revolution period of the disc 11 upon normal reproduction, in response to the above switching pulses applied thereto. Hence, due to the switching pulses which reverse polarity every two frames (1/15 second), the signals fp1 and fp2 are always respectively supplied to detecting circuits 65 and 66 with predetermined polarities, from the gate switching circuit 61.

The detecting circuits 65 and 66 detect the envelopes of their respective input reference signals and convert the input reference signals into D.C. voltages. These D.C. voltages are then supplied to a differential amplifier 67. The differential amplifier 67 compares the output signals of the two detecting circuits 65 and 66 which vary in response to the reproduced levels of the signals fp1 and fp2, and generates an output tracking error signal which indicates the tracking error direction and the error quantity. This error signal passes through a phase compensation circuit 68 and is further amplified to a specific level by a driving amplifier 69.

The output signal of the driving amplifier 69 is applied to the coil 37 of the signal pickup device 14 as a control signal, to control the signal pickup device 14. As a result, the permanent magnet member 32 undergoes displacement within the coil 37, and, accompanied by this movement of the coil 37, the cantilever 33 also undergoes displacement, whereby the reproducing stylus 31 is tracking controlled so that the above tracking error signal becomes zero, that is, so that the stylus 31 correctly traces over the track T of the disc 11. Furthermore, the output signal of the driving amplifier 69 is also supplied to a motor driving control circuit 50 to control the rotational driving of the motor 19 which moves the signal pickup device 14, so that a tracking control is performed in a state where the cantilever of the signal pickup device 14 is constantly positioned at a neutral position.

The pulse generating circuit 63 operates in response to the reproducing mode set by a control part 64 for setting the reproducing mode, and generates switching pulses and skip pulses, which are respectively supplied to the gate switching circuit 61 and the driving amplifier 69.

Figure 6:
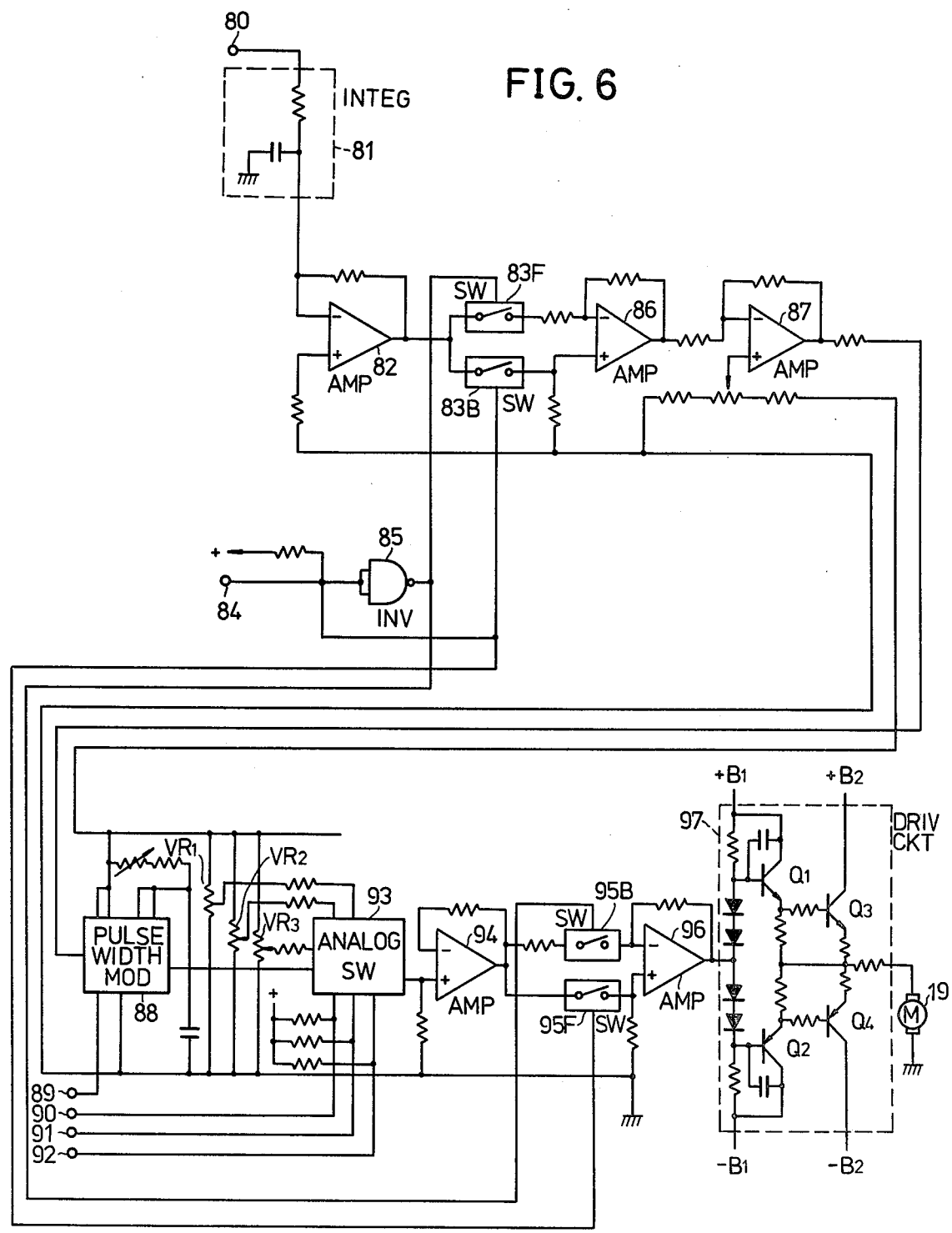
FIG. 6 is a systematic circuit diagram showing an embodiment of a motor control circuit according to the present invention.

Next, an embodiment of a motor driving control circuit 50 in the motor control circuit according to the present invention, will be described in conjunction with FIG. 6. The tracking error signal from the differential amplifier 67 obtained through the phase compensation circuit 68 and the driving amplifier 69, is applied to a terminal 80, and is supplied to an inverting input terminal of an operational amplifier 82 through an integrating circuit 81. The inverted and amplified output signal of the amplifier 82 is supplied to switching circuits 83F and 83B.

A control signal which is representative of the travelling direction of the reproducing stylus 31, is applied to a terminal 84 from the control part 64. This control signal is supplied to switching circuits 83B and 95F, and on the other hand, supplied to switching circuits 83F and 95B after being inverted by an inverter 85. Accordingly, the switching circuits 83F and 95B are closed only upon a forward mode in which the reproducing stylus 31 is moved from the outer peripheral side of the disc 11 towards the direction at the inner peripheral side of the disc 11, and is open upon other states. The switching circuits 83B and 95F are closed only upon a backward mode in which the reproducing stylus 31 is moved from the inner peripheral side of the disc 11 towards the direction at the outer peripheral side of the disc 11, and is open upon other states.

Even when the relative difference between the moving speed of the reproducing stylus and the feeding speed of the reproducing transducer is the same, the leading and lagging relationship between the movements of the reproducing stylus and the reproducing transducer is different upon forward and backward modes. That is, when the moving direction towards the inner peripheral side of the disc from the outer peripheral side of the disc is considered as being a forward direction, for example, the reproducing stylus leads the reproducing transducer during the forward mode, because the reproducing stylus follows the tracks on the disc to move in the forward direction and the reproducing transducer follows this movement of the reproducing stylus. On the other hand, the reproducing transducer leads the reproducing stylus during the backward mode, because the reproducing transducer moves in a backward direction opposite to the forward direction and the reproducing stylus follows this movement of the reproducing transducer. Therefore, the above switching circuits 83F and 83B are provided in order to compensate for the leading and lagging relationship of the reproducing transducer with respect to the reproducing stylus according to the moving direction of the reproducing transducer.

During a forward mode in which the reproducing stylus is moved in the forward direction, the tracking error signal which passes through the closed switching circuit 83F, is supplied to an inverting input terminal of an operational amplifier 86 wherein the signal thus supplied is inverted and amplified, and further supplied to an inverting input terminal of an operational amplifier 87 wherein the signal is inverted and amplified into a voltage over zero volt. On the other hand, during a backward mode in which the reproducing stylus is moved in the backward direction, the tracking error signal which passes through the switching circuit 83B, is supplied to a non-inverting input of the amplifier 86 wherein the signal thus supplied is only amplified, and further supplied to the inverting input terminal of the operational amplifier 87 wherein the amplified signal is inverted and amplified into a signal having a level which is within a predetermined level range. Moreover, the output signal of the amplifier 87 is applied to a pulse width modulating control input terminal of a pulse width modulator 88.

Feed pulses are applied to a trigger input terminal of the pulse width modulator 88 from a terminal 89. These feed pulses are obtained by adding the switching pulses obtained from the pulse generating circuit 63 and pulses having twice the number of kick pulses which forcibly advance the reproducing stylus in the forward direction (in the direction towards the inner peripheral side of the disc) at the recorded part where the third reference signal is recorded, and frequency-dividing the frequency of the sum of the pulses thus obtained into 1/32 the original frequency by a frequency divider (not shown).

Pulses which are synchronized with the feed pulses obtained from the pulse width modulator 88, are supplied to an analog switching circuit 93. The analog switching circuit 93 selectively passes the output pulse of the pulse width modulator 88 or the voltage obtained from a slider of one of three variable resistors VR1, VR2, and VR3 according to the state of the incoming signal obtained from terminals 90 and 91, and supplies the output pulse or the voltage obtained to a non-inverting input terminal of an operational amplifier 94. A signal applied to the analog switching circuit 93 through the terminal 92, is a signal for stopping the feeding of the reproducing stylus 31. The above analog switching circuit 93 passes the output pulse of the pulse width modulator 88 upon reproduction modes of the reproducing apparatus such as normal reproduction, slow-motion reproduction, still reproduction, and quick-motion reproduction, in which the disc 11 is reproduced, and passes the voltage obtained from one of the variable resistors VR1 through VR3 upon modes of the reproducing apparatus such as a random access mode, high-speed search mode, and a mode in which the reproducing transducer is moved from the waiting position to the reproduction starting position on the disc, according to that particular mode. A control pulse formed by a micro-computer (not shown) within the control part 64 in a manner similar to the changeover operation performed by the analog switching circuit 93, is applied to the terminals 90 and 91. Moreover, the feeding speed of the reproducing transducer which is driven by the motor 19 is selected at a high, semi-high, and fast speeds, according to the respective voltages of the variable resistors VR1 through VR3 which are selectively passed through the analog switching circuit 93.

The switching circuit 95F is closed by the control signal from the terminal 84 during the forward mode. Thus, the output of the amplifier 94, is supplied to a non-inverting input terminal of an operational amplifier 96, and is not inverted upon amplification. Further, the switching circuits 95B and 83F are closed by the control signal from the inverter 85 during the backward mode. Hence, the output of the amplifier 94 is supplied to the inverting input terminal of the operational amplifier 96, and is inverted upon amplification. The output signal of the amplifier 96 is supplied to the motor 19 through a driving circuit 97 including transistors Q1 through Q4. The motor 19 is rotated in the forward direction by a signal supplied through the switching circuit 95F, and the reproducing transducer is accordingly moved in the forward direction. On the other hand, the motor 19 is rotated in the backward direction by a signal supplied through the switching circuit 95B, and the reproducing transducer is accordingly moved in the backward direction.

When the number of switching pulses during one revolution of the disc is designated by n, and the number of kick pulses for kicking the reproducing stylus in the forward direction at the recorded part where the reference signal fp3 is recorded is designated by m, pulses having a number proportional to $(n+2m)=k$, are applied to the terminal 89 from the pulse generating circuit 63.

Since the first and second reference signals fp1 and fp2 are recorded with an arrangement relationship described in conjunction with FIG. 4, one switching pulse is generated by the pulse generating circuit 63 and supplied to the gate switching circuit 61 when the reproducing stylus 31 reproduces the reference signal fp3 which is recorded at the changeover connecting part of the reference signals fp1 and fp2. Further, one switching pulse is generated by the pulse generating circuit 63 and supplied to the gate switching circuit 61 when the reproducing stylus 31 is forcibly shifted by one track, because the sides on which the reference signals fp1 and fp2 are recorded reverses in the adjacent tracks. Accordingly, if the reproducing stylus 31 is forcibly shifted by one track at the recorded part where the reference signal fp3 is recorded, one switching pulse is generated due to the reproduction of the reference signal fp3 and one switching pulse is generated due to the forced shifting of the reproducing stylus 31 by one track. However, the supply of two switching pulses to the gate switching circuit 61, is equivalent to switching the gate switching circuit 61 twice. Hence, the gate switching circuit 61 is not switched in reality, and the above generation of two switching pulses is equivalent to as if no switching pulse was generated to switch the gate switching circuit 61. Moreover, if a forward direction kick pulse is generated due to a mode set at the control part 64 at a point where the reference signal fp3 is reproduced, the above kick pulse is considered as being two pulses, that is, as if $m=2$.

In addition, the above switching pulses are obtained at points other than where the reference signal fp3 is reproduced, due to a trigger pulse applied to the flip-flop within the pulse generating circuit 63 from the control part 64, for example, in a case where the reproducing stylus 31 is kick-controlled for one track at a recorded part of a vertical blanking period where the reference signal fp3 does not exist, because the output of the flip-flop within the pulse generating circuit 63 is inverted. This is easily understood by considering the recording positions of the reference signals fp1 and fp2 described heretofore.

Upon normal reproduction, the rotational drive of the D.C. motor 19 is controlled by a switching pulse produced when the reference signal fp3 is reproduced. Upon still reproduction, the rotation of the motor 19 is stopped due to the kickback control performed at the part where the reference signal fp3 is recorded. Furthermore, when a double-speed reproduction in the forward direction is performed by kicking the reproducing stylus 31 in the forward direction by one track during a vertical blanking period which is recorded at a position diametrical to the vertical blanking period recorded part in which the reference signal fp3 exists, for example, two switching pulses and one kick pulse are required for one revolution of the disc. This kick pulse is not generated at the part where the reference signal fp3 is recorded, and hence, this is considered as being two pulses, and the rotation of the motor 19 in controlled at a speed higher than that upon normal reproduction. Furthermore, upon normal-speed backward mode, for example, the reproducing stylus 31 is kicked back at the part where the reference signal fp3 is recorded and at the vertical blanking period recorded part diametrical to the above part where the reference signal fp3 is recorded, every time these parts are reproduced. Accordingly, one switching pulse and two kick pulses are required upon normal-speed backward mode. However, since the two kick pulses are for backward direction movement, the motor 19 is rotationally controlled so that the same feeding speed is obtained as that upon normal mode by the above one switching pulse (the rotating direction of the motor 19 is of course opposite to that upon normal reproduction).

Upon normal reproduction, $k=1$, since $n=1$ and $m=0$. Upon double-speed reproduction, $k=2$, since $n=1+1=2$ and $m=0$. Similarly, upon triple-speed and quadruple-speed reproduction, $k=3$, and $k=4$, respectively, and upon quintuple-speed reproduction, $k=5$ since $n=1$ and $m=1$. Because pulses having a number respective of the reproduction mode are applied to the pulse width modulator 88 as described heretofore, pulses having a width respective of the above reproduction mode are obtained from the pulse width modulator 88. The D.C. motor 19 rotates at a speed respective of the above width of the pulses, and the rotational speed can be varied within a wide range.

The error introduced with respect to the movement of the stylus tip due to the above feeding of the reproducing stylus, introduces fluctuations in the D.C. component of the tracking error signal. Accordingly, in order to correct the error in the feeding operation, the tracking error signal is supplied to the terminal 80 in the present embodiment of the invention, and a voltage respective of the D.C. component of the tracking error signal is passed through the above described circuits and applied to the pulse width modulating control input terminal of the pulse width modulator 88, to vary the output pulse width. When the repetition frequency of the pulses applied to the motor 19 is the same, the rotational speed of the motor 19 increases proportionally with respect to the pulse width of the pulses applied thereto. Accordingly, pulses having a pulse width for correcting the above error introduced in the feeding operation, are obtained from the pulse width modulator 88.

Further, the present invention is not limited to these embodiments, but various variations and modifications may be made without departing from the scope of the present invention.

What is claimed is:

1. A control circuit for a reproducing transducer feeding motor for use in an apparatus for reproducing a video signal from a rotary recording medium on which the video signal is recorded along a spiral track, each track turn of the spiral track containing a plurality of fields of the video signal, first and second reference signals being recorded respectively on opposite sides of the track in a manner such that the first and second reference signals alternate with each other for every track turn, a third reference signal being recorded together with the video signal and being inserted in vertical blanking periods which are recorded at a position on each track turn corresponding to the location where said reference signals switch from one side to the other side, said reproducing transducer comprising reproducing element means for tracing over the spiral track on the rotary recording medium while picking up the video signal and the first, second, and third reference signals, said apparatus comprising separating means for individually separating the first, second, and third reference signals from the output signal of said reproducing element means, pulse generating means for generating a pulse signal in response to the separated third reference signal during normal-picture-motion-reproduction, kick pulse generating means responsive to a mode selection by a control part for generating kick pulses with a timing which corresponds to the vertical blanking periods of the recorded video signal, a predetermined number of the kick pulses corresponding to the selected mode for carrying out a special reproduction of picture motion which differs from the normal-picture-motion-reproduction, shifting means operated in response to each of the kick pulses for causing the reproducing element means to shift to an adjacent track turn of the spiral track within the vertical blanking period recorded on each track turn, switching pulse generating means for generating switching pulses synchronized with each of the kick pulses, except for the timing of the separation of the third reference signal from the output signal of said reproducing element means, and a motor driving means for moving said reproducing transducer along a radial direction across said rotary recording medium, said control circuit comprising:

feed pulse forming means for forming a number of feed pulses proportional to $(n+2m)$ pulses, where n is an integer which is greater than or equal to zero, representing the number of switching pulses generated by said switching pulse generating means in response to the reproduction of the third reference signal, and m is an integer greater than or equal to zero representing the number of kick pulses required for shifting the reproducing element means from one track turn to another track turn toward a center of the rotary recording medium at said position where said third reference signal is recorded; and controlling means for controlling the rotation of said feeding motor responsive to said feed pulses obtained from said feed pulse forming means.

2. A control circuit as claimed in claim 1 in which said feeding motor is a D.C. motor.

3. A control circuit as claimed in claim 2 in which said controlling means comprises a pulse width modulator supplied with said feed pulses, for varying the pulse width according to the number of the supplied feed pulses, and a modulated output applying circuit for applying the output signal of said pulse width modulator to said motor with a polarity corresponding to the feeding direction of said reproducing transducer.

4. A control circuit as claimed in claim 3 which further comprises means for forming a tracking error signal according to the reproduced first and second reference signals, said pulse width modulator performing the pulse width modulation according to a D.C. component of said tracking error signal.

5. A control circuit as claimed in claim 3 which further comprises a plurality of variable resistors for obtaining respectively different voltages, and an analog switching circuit for selectively passing and supplying the voltage obtained from said plurality of variable resistors and the output of said pulse width modulator to said modulated output applying circuit, according to the operational mode of reproduction.

* * * * *